US012767549B2

(12) United States Patent
Hong et al.

(10) Patent No.: US 12,767,549 B2
(45) Date of Patent: Oct. 20, 2026

(54) UNIVERSAL PREPARATION METHOD FOR IN-SITU GROWTH OF LAYERED DOUBLE HYDROXIDE (LDH) LAYER ON SUBSTRATE SURFACE

(71) Applicant: SHENZHEN UNIVERSITY, Shenzhen (CN)

(72) Inventors: Shuxian Hong, Shenzhen (CN); Biqin Dong, Shenzhen (CN); Lei Zeng, Shenzhen (CN); Feng Xing, Shenzhen (CN); Peiyu Chen, Shenzhen (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 640 days.

(21) Appl. No.: 18/211,025

(22) Filed: Jun. 16, 2023

(65) Prior Publication Data

US 2024/0083763 A1 Mar. 14, 2024

(30) Foreign Application Priority Data

Sep. 9, 2022 (CN) ......................... 202211101131.X

(51) Int. Cl.
*C01F 7/784* (2022.01)
*C01F 7/66* (2006.01)

(52) U.S. Cl.
CPC ................ *C01F 7/784* (2022.01); *C01F 7/66* (2013.01); *C01P 2002/22* (2013.01)

(58) Field of Classification Search
CPC ......... C01F 7/784; C01F 7/66; C01P 2002/22
See application file for complete search history.

(56) References Cited

U.S. PATENT DOCUMENTS

| | | | | |
|---|---|---|---|---|
| 2017/0214019 | A1* | 7/2017 | Yokoyama | C04B 35/03 |
| 2022/0002887 | A1* | 1/2022 | Zhao | C25B 11/075 |

FOREIGN PATENT DOCUMENTS

| | | | | |
|---|---|---|---|---|
| CN | 113371765 A * | 9/2021 | | C01G 53/82 |
| CN | 115011990 A * | 9/2022 | | B82Y 40/00 |
| EP | 2743377 A1 * | 6/2014 | | C23C 22/68 |

* cited by examiner

*Primary Examiner* — Anthony J Zimmer
*Assistant Examiner* — Syed T Iqbal
(74) *Attorney, Agent, or Firm* — Maschoff Brennan

(57) ABSTRACT

The present disclosure provides a universal preparation method for in-situ growth of a layered double hydroxide (LDH) layer on a substrate surface, and belongs to the technical field of material synthesis. In the present disclosure, an LDH protective layer is grown in situ on a surface of a substrate by means of electrodeposition combined with hydrothermal treatment. Specifically, a seed crystal layer of the LDH is formed on the substrate surface by the electrodeposition, and then obtained LDH seed crystals are crystallized and grown by Ostwald ripening through the hydrothermal treatment. In this way, the LDH protective layer is formed in which an interlayer anion is a nitrate. The protective layer protects the substrate against corrosion. Moreover, since the interlayer anion is the nitrate, the protective layer can be exchanged with other corrosion-inhibiting anions, and is modifiable.

7 Claims, 13 Drawing Sheets

UNIVERSAL PREPARATION METHOD FOR IN-SITU GROWTH OF LAYERED DOUBLE HYDROXIDE (LDH) LAYER ON SUBSTRATE SURFACE

CROSS REFERENCE TO RELATED APPLICATION

This patent application claims the benefit and priority of Chinese Patent Application No. 202211101131.X, filed with the China National Intellectual Property Administration on Sep. 9, 2022, the disclosure of which is incorporated by reference herein in its entirety as part of the present application.

TECHNICAL FIELD

The present disclosure relates to the technical field of material synthesis, in particular to a universal preparation method for in-situ growth of a layered double hydroxide (LDH) layer on a substrate surface.

BACKGROUND

Layered double hydroxide (LDH) is a substance similar in structure to brucite. The chemical composition of LDH has a general formula: $[M^{2+}_{1-x}M^{3+}(OH)_2]^{x+}(A^{n-})_{x/n}\cdot mH_2O$. $M^{2+}$ and $M^{3+}$ are divalent and trivalent metal cations located on a main layer plate, respectively, while x is a molar ratio of $M^{3+}/(M^{2+}+M^{3+})$, and m is the number of interlayer water molecules. An adsorption performance of the LDH for anions enhances with an increase of anion charge and a decrease of anion particle size. An absorption intensity of the LDH to anions is as follows: $CO_3^{2-}>SO_4^{2-}>HPO_4^{-}>OH^{-}>F^{-}>Cl^{-}>Br^{-}>NO_3^{-}$. Due to desirable physical barrier properties and exchangeability of interlayer anions, LDH is a promising material in the field of metal corrosion protection. LDHs can effectively enhance the corrosion resistance of alloys such as magnesium and aluminum by trapping corrosion media through interlayer ion exchange or intercalating corrosion-inhibiting anions for self-healing. Meanwhile, the LDH is also widely used in the fields of catalysis, energy, environmental purification, drug loading and the like. However, LDH is mostly studied in the form of powders, and there are few reports on the preparation and application of the LDH as a coating or a protective film in devices. In particular, there are few studies on the in-situ growth of the LDH on the surface of alkali inert materials such as iron and steel.

At present, most researchers can only grow LDH films in situ on a material surface using a urea hydrothermal method. However, due to the hydrolysis of urea, the intercalated anion in the LDH gallery can only be carbonate. This is not conducive to the replacement and modification of LDH interlayer anions, and is also not conducive to the goal of intelligent LDH films.

Therefore, it has become a difficult problem in the prior art to provide a method for preparing an LDH with replaceable interlayer anions.

SUMMARY

An objective of the present disclosure is to provide a universal preparation method for in-situ growth of an LDH layer on a substrate surface. In the present disclosure, an LDH prepared by the method has exchangeable interlayer anions.

To achieve the above objective, the present disclosure provides the following technical solutions:

The present disclosure provides a universal preparation method for in-situ growth of an LDH layer on a substrate surface, including the following steps:

(1) mixing a divalent metal nitrate, a trivalent metal nitrate, and water to obtain a mixed solution;

(2) constructing a three-electrode system using the mixed solution obtained in step (1) as an electrodeposition solution and a substrate as a working electrode, and conducting electrodeposition to obtain a deposited substrate;

(3) mixing the divalent metal nitrate, the trivalent metal nitrate, water, and ammonia water to obtain a hydrothermal reaction solution; and (4) mixing the deposited substrate obtained in step (2) with the hydrothermal reaction solution obtained in step (3), and then conducting a hydrothermal reaction to obtain an LDH protective layer-containing substrate; where there is no time sequence between steps (3) and (1).

Preferably, in steps (1) and (3), the divalent metal nitrate is one selected from the group consisting of zinc nitrate, magnesium nitrate, cobalt nitrate, nickel nitrate, copper nitrate, and calcium nitrate.

Preferably, in steps (1) and (3), the trivalent metal nitrate is selected from the group consisting of aluminum nitrate and iron nitrate.

Preferably, in steps (1) and (3), the divalent metal nitrate and the trivalent metal nitrate are at a molar ratio of (2-4):1.

Preferably, in step (1), the divalent metal nitrate in the mixed solution has a concentration of 40 mmol/L to 50 mmol/L.

Preferably, in step (2), the electrodeposition is conducted at a voltage of −1.2 V to −1.4 V for 200 sec to 800 sec.

Preferably, in step (3), the hydrothermal reaction solution has a pH value of 8 to 14.

Preferably, in step (3), a salt selected from the group consisting of a molybdate, a vanadate, and a dihydrogen phosphate is further added.

Preferably, in step (4), the hydrothermal reaction is conducted at 90° C. to 140° C. for 12 h to 24 h.

The present disclosure further provides an LDH protective layer-containing substrate prepared by the method.

The present disclosure provides a universal preparation method for in-situ growth of an LDH layer on a substrate surface, including the following steps: (1) mixing a divalent metal nitrate, a trivalent metal nitrate, and water to obtain a mixed solution; (2) constructing a three-electrode system using the mixed solution obtained in step (1) as electrolyte solution and the substrate as a working electrode, and conducting electrodeposition to obtain a deposited substrate; (3) mixing the divalent metal nitrate, the trivalent metal nitrate, water, and ammonia water to obtain a hydrothermal reaction solution; and (4) mixing the deposited substrate obtained in step (2) with the hydrothermal reaction solution obtained in step (3), and then conducting a hydrothermal reaction to obtain an LDH protective layer-coated substrate; where there is no time sequence between steps (3) and (1). In the present disclosure, an LDH protective layer is grown in situ on a substrate surface by using an electrodeposition combined with hydrothermal treatment. Specifically, a seed crystal layer of the LDH is formed on the substrate surface via electrodeposition, and then obtained LDH seed crystals crystallized and grew through a Ostwald ripening process during the hydrothermal reaction. In this way, the LDH protective layer with intercalated nitrate anion is constructed. The protective layer protects the substrate against corrosion. Moreover, the intercalated nitrate anion in the LDH gallery can be easily replaced by other anions. The results of examples show that an LDH protective layer prepared by the present disclosure has a corrosion potential of −548.59 mV, while a steel substrate without a protective layer has a corrosion potential of −708.57 mV. Therefore, the protective layer has better anti-corrosion properties.

DETAILED DESCRIPTION OF THE EMBODIMENTS

Figure 1:
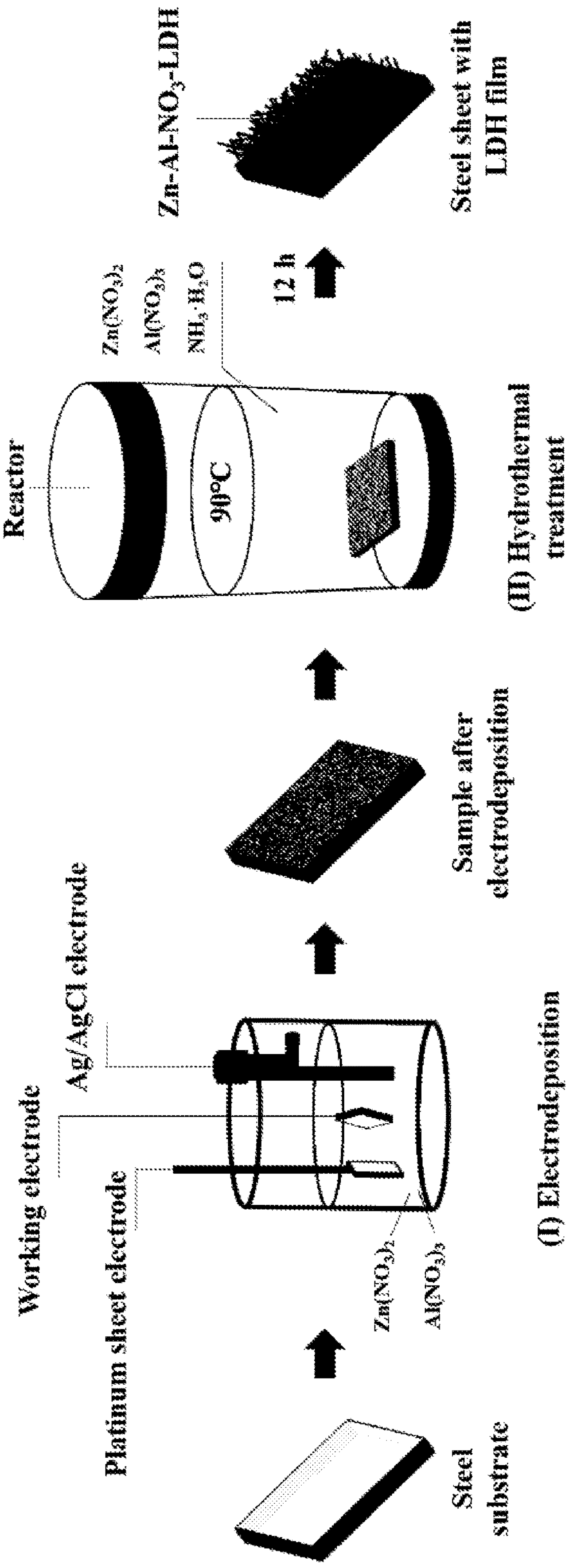
FIG. 1 shows a schematic diagram of a universal preparation method for in-situ growth of an LDH layer in Example 1 of the present disclosure.

The present disclosure provides a universal preparation method for in-situ growth of an LDH layer on a substrate surface, including the following steps:

(1) mixing a divalent metal nitrate, a trivalent metal nitrate, and water to obtain a mixed solution;

(2) constructing a three-electrode system using the mixed solution obtained in step (1) as an electrodeposition solution and a substrate as a working electrode, and conducting electrodeposition to obtain a deposited substrate;

(3) mixing the divalent metal nitrate, the trivalent metal nitrate, water, and ammonia water to obtain a hydrothermal reaction solution; and (4) mixing the deposited substrate obtained in step (2) with the hydrothermal reaction solution obtained in step (3), and then conducting a hydrothermal reaction to obtain an LDH protective layer-containing substrate; where there is no time sequence between steps (3) and (1).

Unless otherwise specified, there are no particular limitations on sources of all components in the present disclosure, as long as commercially available products well known to a person skilled in the art or products prepared by conventional preparation methods may be used.

In the present disclosure, a divalent metal nitrate, a trivalent metal nitrate, and water are mixed to obtain a mixed solution.

In the present disclosure, the divalent metal nitrate is preferably one selected from the group consisting of zinc nitrate, magnesium nitrate, cobalt nitrate, nickel nitrate, copper nitrate, and calcium nitrate.

In the present disclosure, the trivalent metal nitrate is preferably selected from the group consisting of aluminum nitrate and iron nitrate.

In the present disclosure, the divalent metal nitrate and the trivalent metal nitrate are at a molar ratio of preferably (2-4):1, more preferably (2.5-3.5):1, and most preferably 3:1. Limiting the molar ratio of the divalent metal nitrate to the trivalent metal nitrate within the above range can adjust a structure of the LDH to improve the corrosion resistance.

In the present disclosure, the water is preferably deionized water.

In the present disclosure, the divalent metal nitrate in the mixed solution has a concentration of preferably 40 mmol/L to 50 mmol/L, more preferably 42 mmol/L to 48 mmol/L, and most preferably 44 mmol/L to 46 mmol/L. Limiting the concentration of the divalent metal nitrate in the mixed solution within the above range can make LDH seed crystals generated during the electrodeposition have better quality. In this way, the subsequently formed LDH protective layer is not easy to fall off.

In the present disclosure, there is no special limitation on an operation method of mixing the divalent metal nitrate, the trivalent metal nitrate, and water, and a technical scheme of material mixing well known to those skilled in the art can be adopted.

In the present disclosure, a three-electrode system is constructed using the mixed solution as an electrodeposition solution and a substrate as a working electrode, and electrodeposition is conducted to obtain a deposited substrate.

In the present disclosure, there are no special limitations on the type, shape, and size of the substrate, which can be selected according to actual needs. The substrate includes preferably steel sheet, steel bar, carbon cloth, FTO conductive glass, titanium foil, or nickel foam.

In the present disclosure, a counter electrode of the three-electrode system is preferably a platinum sheet; a reference electrode of the three-electrode system is preferably Ag/AgCl.

In the present disclosure, the electrodeposition is conducted at a voltage of preferably −1.2 V to −1.4 V, more preferably −1.3 V for preferably 200 sec to 800 sec, more preferably 300 sec to 700 sec, and most preferably 400 sec to 600 sec. Limiting the voltage and time of the electrodeposition within the above range can improve a quality of the generated LDH seed crystals, thus making the LDH protective layer less likely to fall off. During the electrodeposition, the divalent metal nitrate reacts with the trivalent metal nitrate to form the LDH seed crystals, which are crystallized and grown in the subsequent hydrothermal reaction to form the LDH protective layer.

In the present disclosure, after the electrodeposition is completed, an electrodeposited product is preferably washed and dried in sequence. There is no special limitation on an operation mode of the washing and drying, and a technical solution of washing and drying well known to those skilled in the art can be adopted.

In the present disclosure, the divalent metal nitrate, the trivalent metal nitrate, water, and ammonia water are mixed to obtain a hydrothermal reaction solution.

In the present disclosure, the divalent metal nitrate is preferably one selected from the group consisting of zinc nitrate, magnesium nitrate, cobalt nitrate, nickel nitrate, copper nitrate, and calcium nitrate.

In the present disclosure, the trivalent metal nitrate is preferably selected from the group consisting of aluminum nitrate and iron nitrate.

In the present disclosure, the divalent metal nitrate in the hydrothermal reaction solution is of the same type as the divalent metal nitrate in the mixed solution; and the trivalent metal nitrate in the hydrothermal reaction solution is of the same type as the trivalent metal nitrate in the mixed solution.

In the present disclosure, the divalent metal nitrate and the trivalent metal nitrate are at a molar ratio of preferably (2-4):1, more preferably (2.5-3.5):1, and most preferably 3:1.

In the present disclosure, the molar ratio of the divalent metal nitrate to the trivalent metal nitrate in the hydrothermal reaction solution is the same as that of the divalent metal nitrate to the trivalent metal nitrate in the mixed solution.

In the present disclosure, the hydrothermal reaction solution has the divalent metal nitrate at a concentration of preferably 55 mmol/L to 65 mmol/L, more preferably 58 mmol/L to 62 mmol/L, and most preferably 60 mmol/L. Limiting the concentration of the divalent metal nitrate in the hydrothermal reaction solution within the above range can facilitate the crystal growth of the LDH seed crystals, thereby further improving a performance of the LDH protective layer.

In the present disclosure, the hydrothermal reaction solution has a pH value of preferably 8 to 14, more preferably 9 to 12, and even more preferably 10 to 11. Limiting the pH value of the hydrothermal reaction solution within the above range can adjust microscopic morphology of the LDH protective layer, thereby further improving the performance of the LDH protective layer.

In the present disclosure, the ammonia water is used to adjust the pH value of the hydrothermal reaction solution. There is no special limitation on a concentration and a dosage of the ammonia water, as long as the pH value of the hydrothermal reaction solution is within the above range.

In the present disclosure, a process of mixing the divalent metal nitrate, the trivalent metal nitrate, water, and the ammonia water preferably includes: mixing the divalent metal nitrate, the trivalent metal nitrate, and water, and then adding the ammonia water to adjust the pH value. During the mixing, nitrogen is preferably continuously introduced. The continuous introduction of nitrogen can prevent carbon dioxide in the atmosphere from dissolving into the solution, thereby avoiding the introduction of carbonate ions into the LDH.

In the present disclosure, a molybdate, a vanadate, or a dihydrogen phosphate is preferably added to the hydrothermal reaction solution, more preferably sodium molybdate, sodium vanadate, or disodium hydrogen phosphate is added.

In the present disclosure, the molybdate, vanadate, or dihydrogen phosphate is used to provide molybdate, vanadate, or phosphate. These acid radicals can replace the interlayer nitrate anions of LDH, thus further improving an anti-corrosion performance of the LDH protective layer.

In the present disclosure, the molybdate, vanadate, or dihydrogen phosphate and the divalent metal nitrate in the hydrothermal reaction solution are at a molar ratio of preferably (1-2):1, more preferably (1.2-1.8):1, and most preferably (1.5-1.7):1. Limiting the molar ratio of the molybdate, vanadate, or dihydrogen phosphate to the divalent metal nitrate in the hydrothermal reaction solution within the above range can adjust the type and quantity of interlayer anions in the LDH protective layer, thereby further improving the anti-corrosion performance.

In the present invention, the hydrothermal reaction solution is preferably ready-to-use. The ready-to-use operation can prevent the hydrothermal reaction solution from absorbing carbon dioxide in the air, thereby preventing the product from containing carbonate ions.

In the present invention, the deposited substrate is mixed with the hydrothermal reaction solution, and then a hydrothermal reaction is conducted to obtain an LDH protective layer-containing substrate.

In the present disclosure, when the hydrothermal reaction is conducted, the deposited substrate is preferably placed vertically to a bottom of a hydrothermal reaction vessel.

In the present disclosure, there is no special limitation on a dosage of the hydrothermal reaction solution, as long as the solution can submerge the deposited substrate.

In the present disclosure, the hydrothermal reaction is conducted at preferably 90° C. to 140° C., more preferably 90° C. to 120° C. for preferably 12 h to 24 h, more preferably 15 h to 20 h.

Limiting the temperature and time of the hydrothermal reaction within the above range can make the LDH seed crystals fully ripen and grow to form the LDH protective layer, and can adjust the morphology of the LDH protective layer to further improve its performance.

In the present disclosure, after the hydrothermal reaction is completed, a product of the hydrothermal reaction is preferably cooled, washed, and dried in sequence. There is no special limitation on technical solutions of the cooling, washing, and drying, and technical solutions of cooling, washing, and drying well known to those skilled in the art can be used.

In the present disclosure, an LDH protective layer is grown in situ on a surface of a substrate by means of electrodeposition combined with hydrothermal treatment. Specifically, a seed crystal layer of the LDH is formed on the substrate surface by the electrodeposition, and then obtained LDH seed crystals are crystallized and grown by Ostwald ripening through the hydrothermal treatment. In this way, an LDH protective layer is formed with replaceable interlayer anions. Process parameters such as the dosage of each component, reaction temperature, and reaction time are controlled to adjust the morphology of the LDH protective layer, thus further improving its anti-corrosion performance.

The present disclosure further provides an LDH protective layer-containing substrate prepared by the method, including a substrate and an LDH protective layer grown on a surface of the substrate.

In the present disclosure, the LDH protective layer has desirable physical barrier performance and exchangeability of interlayer anions. The protective layer can trap corrosion media through interlayer ion exchange, thereby improving the corrosion resistance of the substrate.

The technical solutions of the present disclosure will be clearly and completely described below with reference to the examples of the present disclosure. Apparently, the described examples are merely a part rather than all of the examples of the present disclosure. All other embodiments obtained by a person of ordinary skill in the art based on the embodiments of the present disclosure without creative efforts shall fall within the protection scope of the present disclosure.

Example 1

In this example, a schematic diagram of a method was shown in FIG. 1. An electrodeposition solution was formulated with zinc nitrate and aluminum nitrate, and a three-electrode system was built with a steel substrate as a working electrode for electrodeposition. A hydrothermal reaction solution was prepared with zinc nitrate, silver nitrate, and ammonia water, and then a hydrothermal treatment was conducted to obtain a steel sheet containing an LDH film.

(1) The zinc nitrate at a concentration of 45 mmol/L, the aluminum nitrate at a concentration of 15 mmol/L, and water were mixed, and stirred until the solids were completely dissolved to form a clear and transparent solution, so as to obtain a mixed solution, where the zinc nitrate and the aluminum nitrate were at a molar ratio of 3:1.

(2) A three-electrode system was constructed with a steel sheet substrate as a working electrode, the mixed solution obtained in step (1) as an electrodeposition solution, a platinum sheet as a counter electrode, and Ag/AgCl as a reference electrode. Electrodeposition was conducted at a voltage of −1.2 V for 300 sec, the substrate was taken out, rinsed with water and ethanol, and then dried naturally to obtain a deposited substrate.

(3) The zinc nitrate at a concentration of 60 mmol/L, the aluminum nitrate at a concentration of 20 mmol/L, and water were mixed, and then ammonia water was added to adjust a pH value to 10, to obtain a hydrothermal reaction solution, where the zinc nitrate and the aluminum nitrate were at a molar ratio of 3:1, and nitrogen was continuously introduced during the preparation.

(4) The deposited substrate obtained in step (2) was vertically placed in a hydrothermal reactor, the hydrothermal reaction solution obtained in step (3) was added to submerge the deposited substrate, and a hydrothermal reaction was conducted at 90° C. for 12 h. An obtained product was cooled, washed, and dried to obtain a substrate containing an LDH (ZnAl—$NO_3$-LDH) protective layer.

Example 2

The electrodeposition voltage in step (2) of Example 1 was replaced with −1.3 V, while other parameters were the same as those in Example 1.

Example 3

The electrodeposition voltage in step (2) of Example 1 was replaced with −1.4 V, while other parameters were the same as those in Example 1.

Example 4

The steel sheet substrate in step (2) of Example 3 was replaced with an FTO conductive glass, while other parameters were the same as those in Example 3.

Example 5

The steel sheet substrate in step (2) of Example 3 was replaced with a titanium foil, while other parameters were the same as those in Example 3.

Example 6

The steel sheet substrate in step (2) of Example 3 was replaced with a nickel foam, while other parameters were the same as those in Example 3.

Example 7

(1) The magnesium nitrate at a concentration of 45 mmol/L, the aluminum nitrate at a concentration of 15 mmol/L, and water were mixed, and stirred until the solids were completely dissolved to form a clear and transparent solution, so as to obtain a mixed solution, where the magnesium nitrate and the aluminum nitrate were at a molar ratio of 3:1.

(2) A three-electrode system was constructed with a steel bar substrate as a working electrode, the mixed solution obtained in step (1) as an electrodeposition solution, a platinum sheet as a counter electrode, and Ag/AgCl as a reference electrode. Electrodeposition was conducted at a voltage of −1.4 V for 300 sec, the substrate was taken out, rinsed with water and ethanol, and then dried naturally to obtain a deposited substrate.

(3) The magnesium nitrate at a concentration of 60 mmol/L, the aluminum nitrate at a concentration of 20 mmol/L, and water were mixed, and then ammonia water was added to adjust a pH value to 10, to obtain a hydrothermal reaction solution, where the magnesium nitrate and the aluminum nitrate were at a molar ratio of 3:1, and nitrogen was continuously introduced during the preparation.

(4) The deposited substrate obtained in step (2) was vertically placed in a hydrothermal reactor, the hydrothermal reaction solution obtained in step (3) was added to submerge the deposited substrate, and a hydrothermal reaction was conducted at 120° C. for 12 h. An obtained product was cooled, washed, and dried to obtain a substrate containing an LDH (MgAl—$NO_3$-LDH) protective layer.

Example 8

The steel bar substrate in step (2) of Example 7 was replaced with a carbon cloth, while other parameters were the same as those in Example 7.

Example 9

The steel bar substrate in step (2) of Example 7 was replaced with an FTO conductive glass, while other parameters were the same as those in Example 7.

Example 10

(1) The zinc nitrate at a concentration of 45 mmol/L, the aluminum nitrate at a concentration of 15 mmol/L, and water were mixed, and stirred until the solids were completely dissolved to form a clear and transparent solution, so as to obtain a mixed solution, where the zinc nitrate and the aluminum nitrate were at a molar ratio of 3:1.

(2) A three-electrode system was constructed with a steel bar substrate as a working electrode, the mixed solution obtained in step (1) as an electrodeposition solution, a platinum sheet as a counter electrode, and Ag/AgCl as a reference electrode. Electrodeposition was conducted at a voltage of −1.4 V for 300 sec, the substrate was taken out, rinsed with water and ethanol, and then dried naturally to obtain a deposited substrate.

(3) The zinc nitrate at a concentration of 60 mmol/L, the aluminum nitrate at a concentration of 20 mmol/L, sodium dihydrogen phosphate at a concentration of 100 mmol/L, and water were mixed, and then ammonia water was added to adjust a pH value to 10, to obtain a hydrothermal reaction solution, where the zinc nitrate and the aluminum nitrate were at a molar ratio of 3:1, the sodium dihydrogen phosphate and the zinc nitrate were at a molar ratio of 1.7:1, and nitrogen was continuously introduced during the preparation.

(4) The deposited substrate obtained in step (2) was vertically placed in a hydrothermal reactor, the hydrothermal reaction solution obtained in step (3) was added to submerge the deposited substrate, and a hydrothermal reaction was conducted at 90° C. for 12 h. An obtained product was cooled, washed, and dried to obtain a substrate containing a phosphate-intercalated LDH protective layer.

Example 11

(1) The zinc nitrate at a concentration of 45 mmol/L, the aluminum nitrate at a concentration of 15 mmol/L, and water were mixed, and stirred until the solids were completely dissolved to form a clear and transparent solution, so as to obtain a mixed solution, where the zinc nitrate and the aluminum nitrate were at a molar ratio of 3:1.

(2) A three-electrode system was constructed with a steel bar substrate as a working electrode, the mixed solution obtained in step (1) as an electrodeposition solution, a platinum sheet as a counter electrode, and Ag/AgCl as a reference electrode. Electrodeposition was conducted at a voltage of −1.4 V for 300 sec, the substrate was taken out, rinsed with water and ethanol, and then dried naturally to obtain a deposited substrate.

(3) The zinc nitrate at a concentration of 60 mmol/L, the aluminum nitrate at a concentration of 20 mmol/L, sodium molybdate at a concentration of 100 mmol/L, and water were mixed, and then ammonia water was added to adjust a pH value to 10, to obtain a hydrothermal reaction solution, where the zinc nitrate and the aluminum nitrate were at a molar ratio of 3:1, the sodium molybdate and the zinc nitrate were at a molar ratio of 1.7:1, and nitrogen was continuously introduced during the preparation.

(4) The deposited substrate obtained in step (2) was vertically placed in a hydrothermal reactor, the hydrothermal reaction solution obtained in step (3) was added to submerge the deposited substrate, and a hydrothermal reaction was conducted at 90° C. for 12 h. An obtained product was cooled, washed, and dried to obtain a substrate containing a molybdate-intercalated LDH protective layer.

Comparative Example 1

The electrodeposition voltage in step (2) of Example 1 was replaced with −1.1V, while other parameters were the same as those in Example 1.

Figure 2:
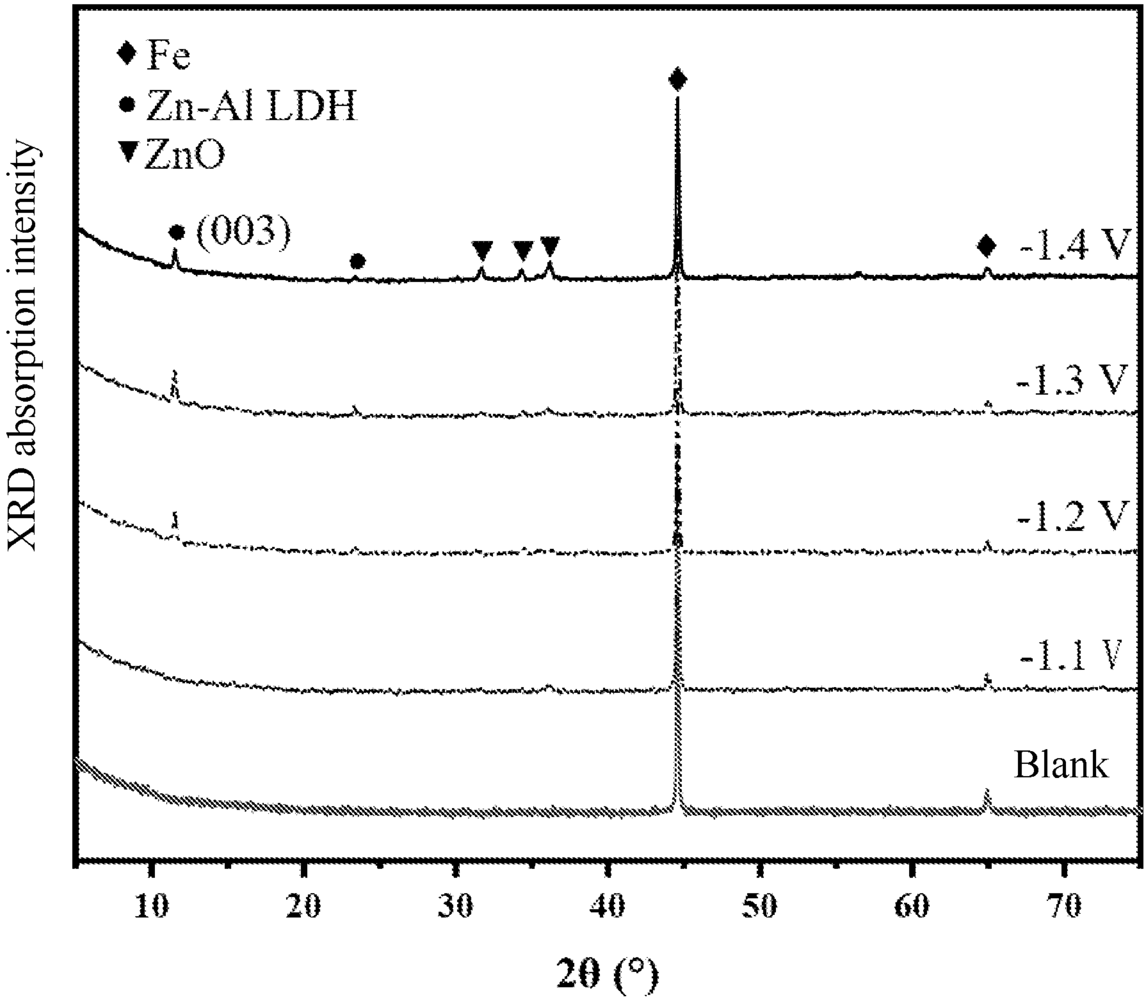
FIG. 2 shows X-ray diffraction (XRD) patterns of products in Examples 1 to 3 and Comparative Example 1 of the present disclosure.
Figure 3:
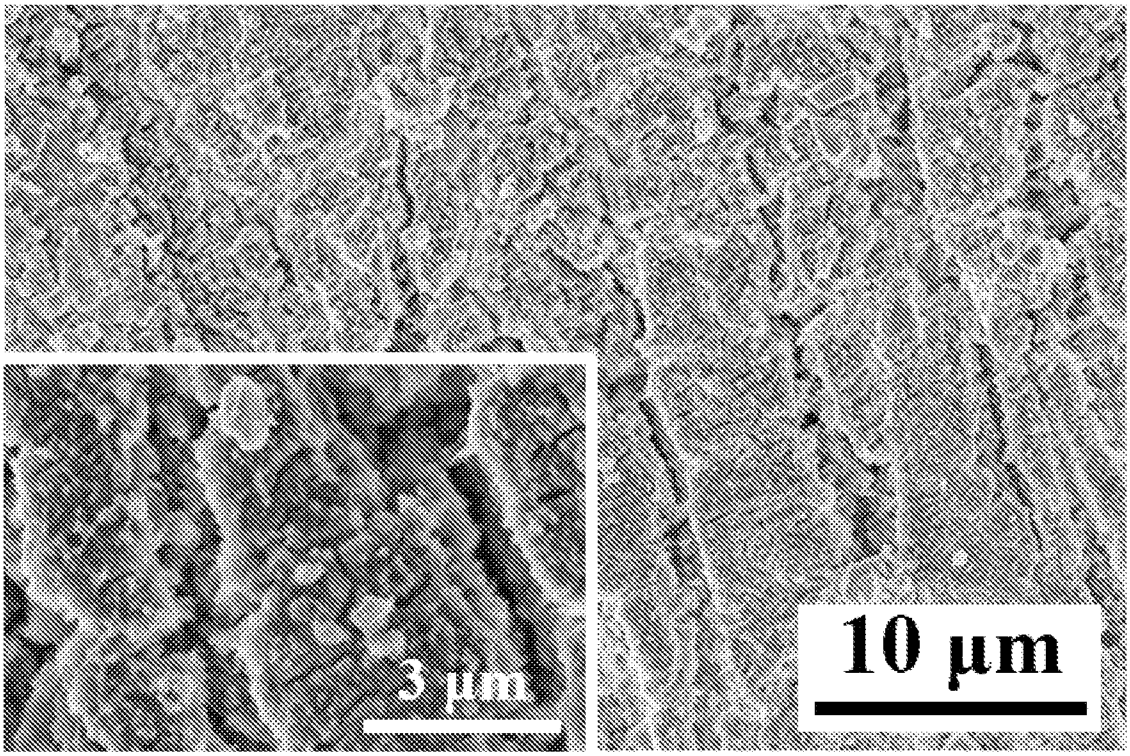
FIG. 3 shows a scanning electron microscopy (SEM) image of the product in Example 1 of the present disclosure.
Figure 4:
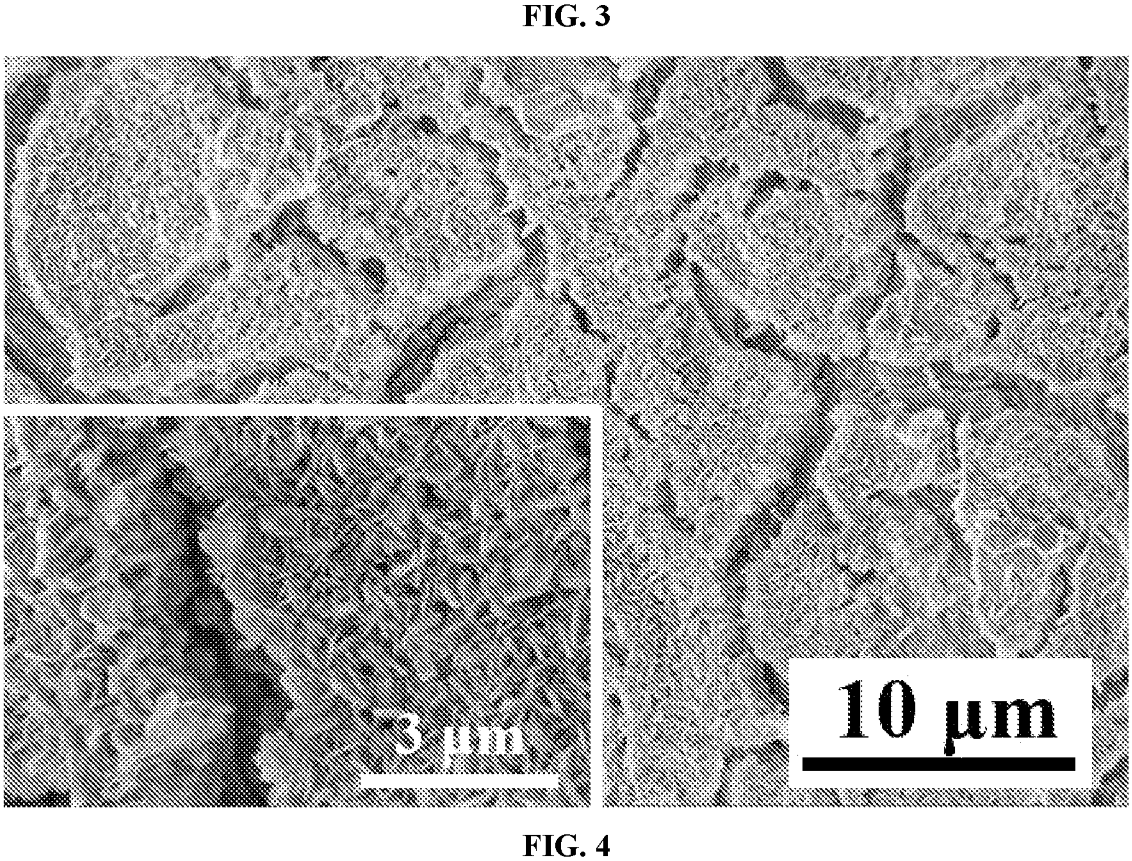
FIG. 4 shows a SEM image of the product in Example 2 of the present disclosure.
Figure 5:
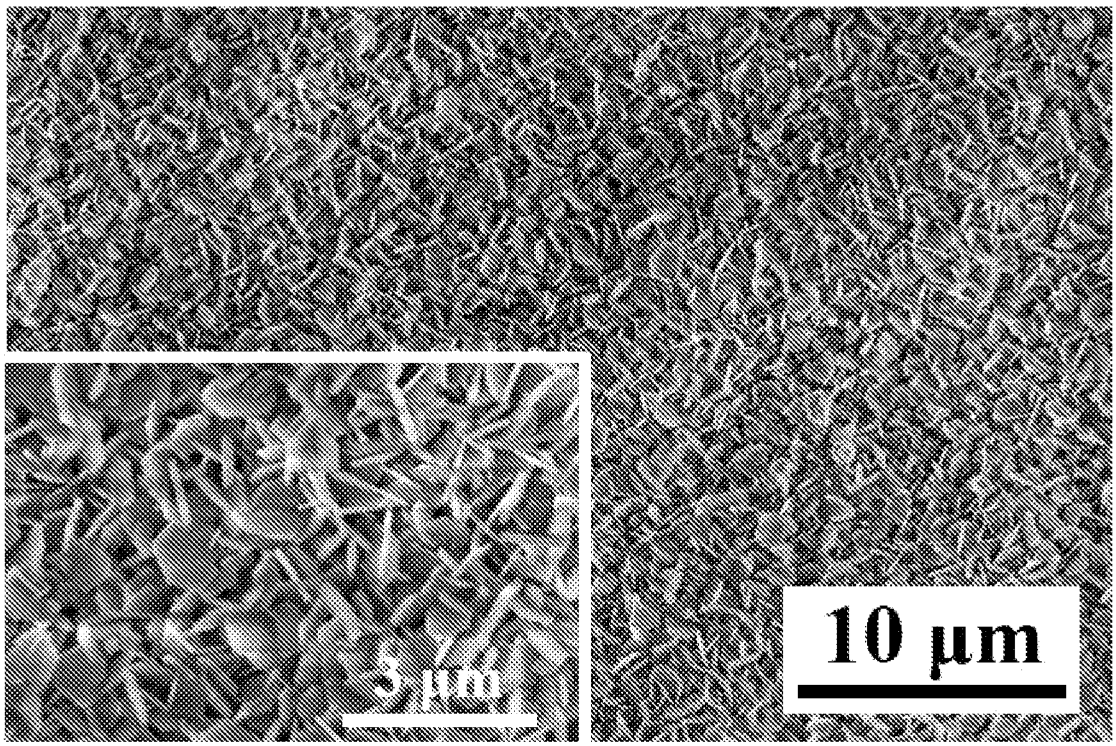
FIG. 5 shows a SEM image of the product in Example 3 of the present disclosure.
Figure 6:
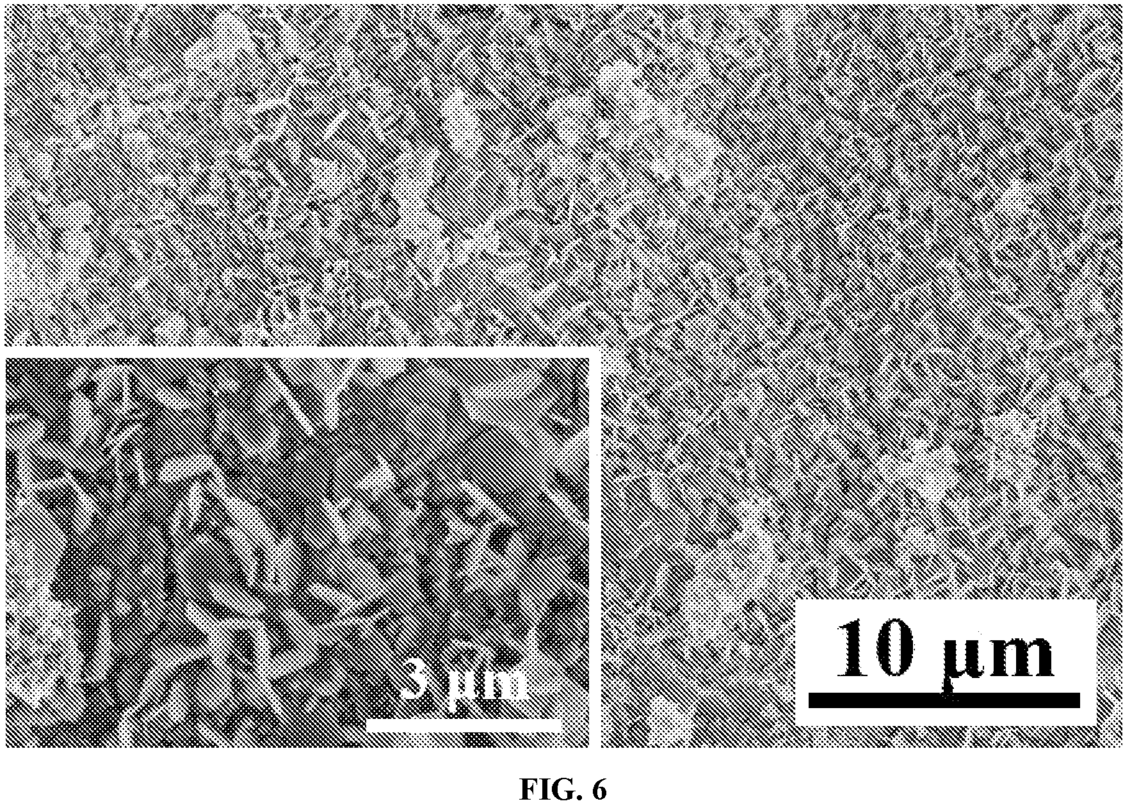
FIG. 6 shows a SEM image of the product in Comparative Example 1 of the present disclosure.

An XRD test was conducted on the products of Examples 1 to 3 and Comparative Example 1, and obtained XRD patterns were shown in FIG. 2. As shown in FIG. 2, when the voltage was −1.1 V, the product had no characteristic peak of LDH. When the voltages were −1.2 V, −1.3 V, and −1.4 V, the products all had the characteristic peak of LDH, and could successfully grow LDH on the surface of the steel sheet. When the voltage was −1.4 V, in addition to the characteristic peaks of LDH and steel substrate, the characteristic peaks of ZnO also appeared, proving that impurities were generated when the voltage was too high.

The products of Examples 1 to 3 and Comparative Example 1 were observed by SEM, and obtained SEM images were shown in FIG. 3 to FIG. 6, respectively. It was seen from FIG. 3 to FIG. 6 that the grown LDH had a hexagonal sheet structure. Moreover, when the voltage was −1.3V, the LDH sheets were densest at most and overlapped each other.

Figure 7:
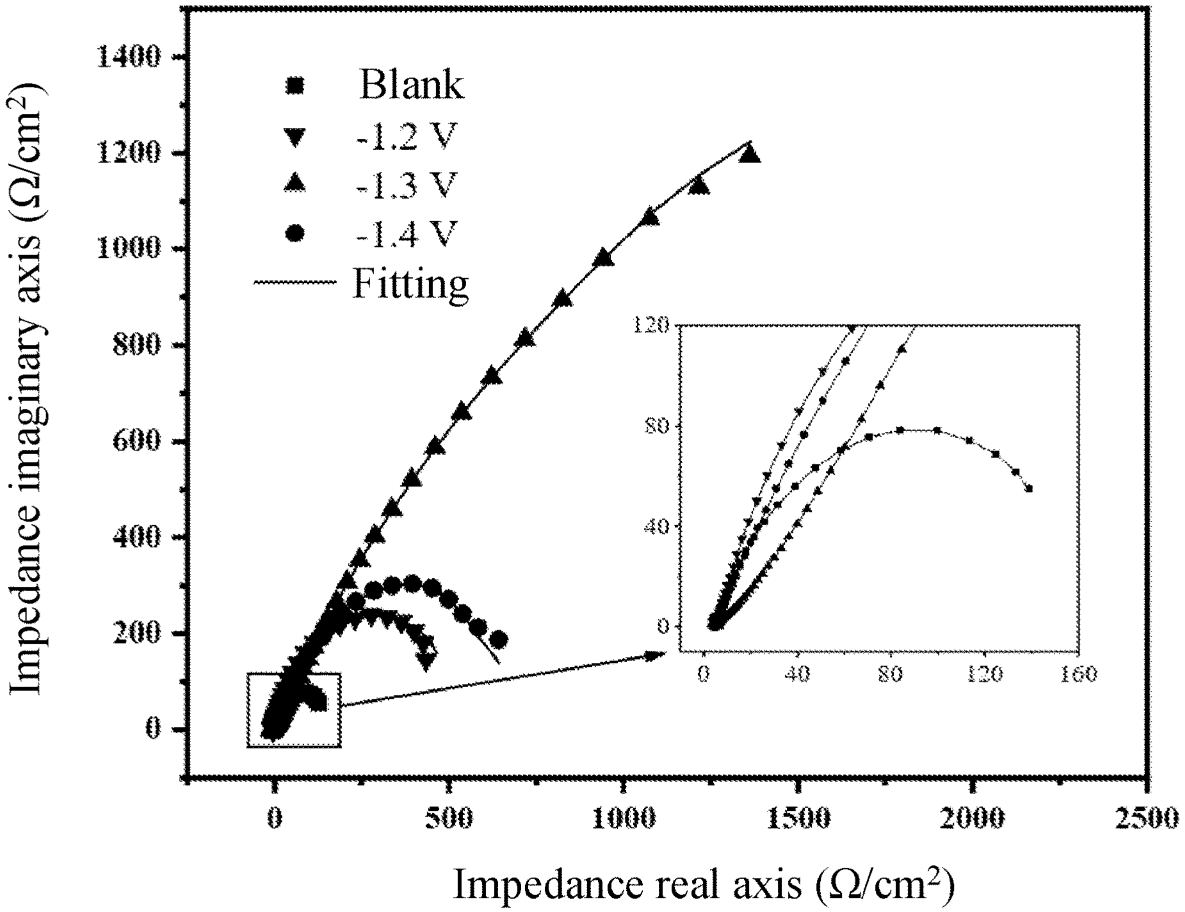
FIG. 7 shows Nyquist diagrams of the product in Examples 1 to 3 of the present disclosure and blank steel sheets.
Figure 8:
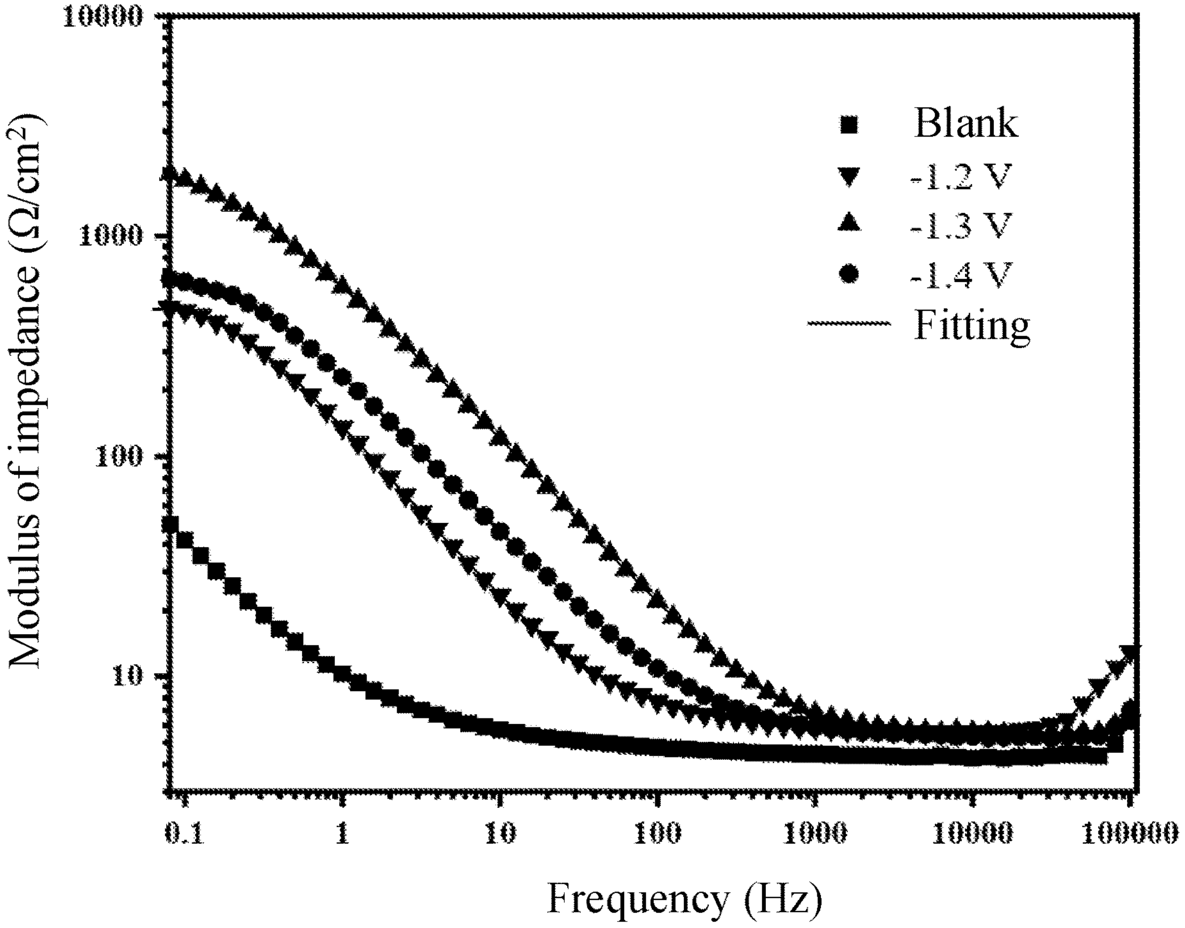
FIG. 8 shows Bode plots of the product in Examples 1 to 3 of the present disclosure and blank steel sheets.
Figure 9:
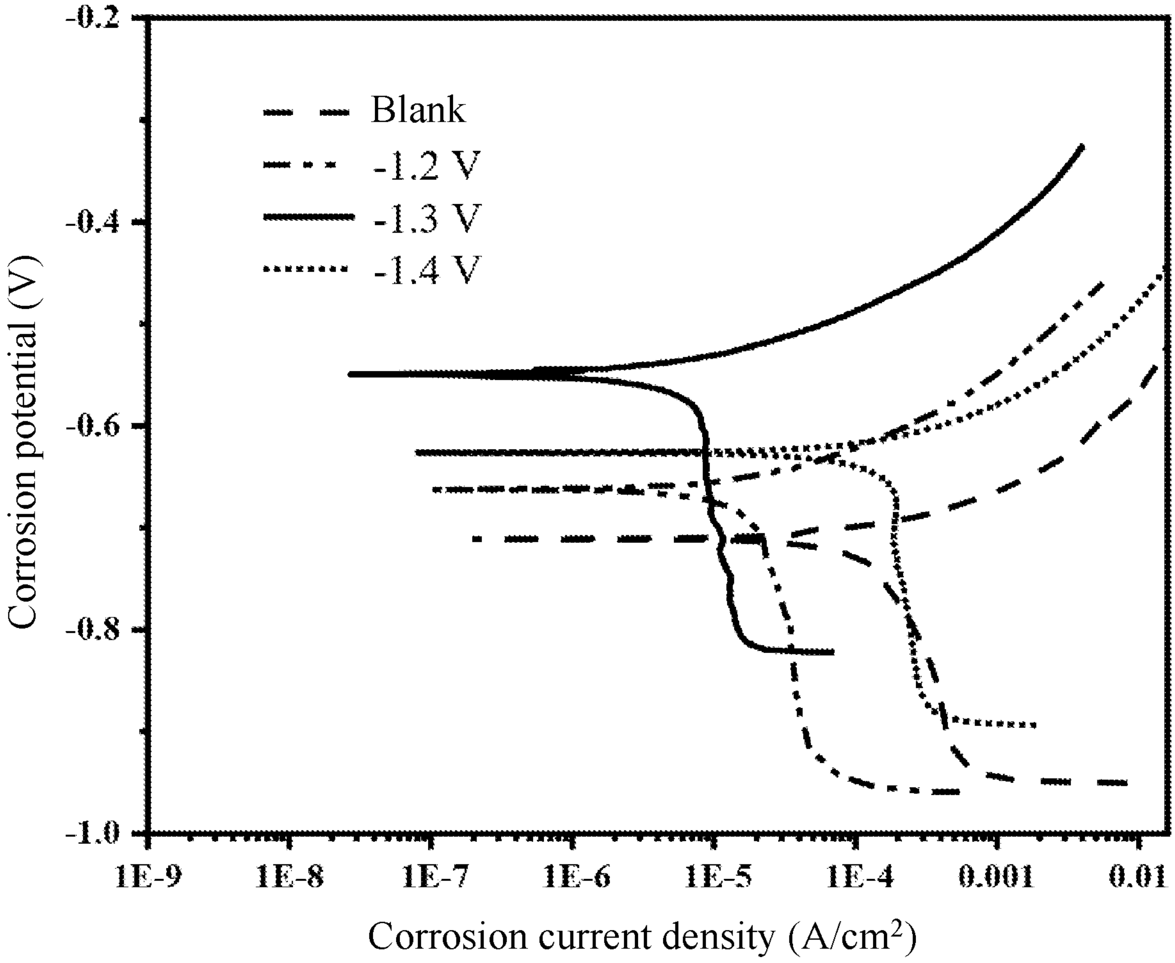
FIG. 9 shows polarization curves of the product in Examples 1 to 3 of the present disclosure and blank steel sheets.
Figure 10:
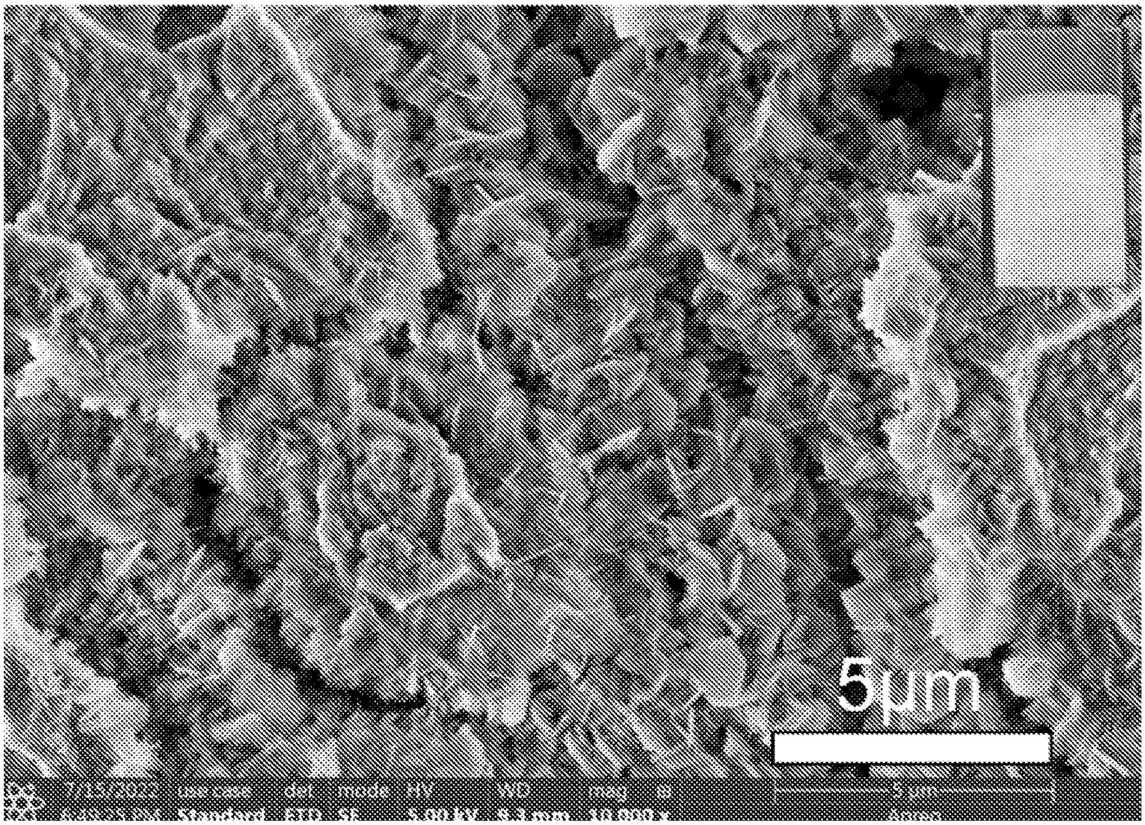
FIG. 10 shows a SEM image of the product in Example 4 of the present disclosure.
Figure 11:
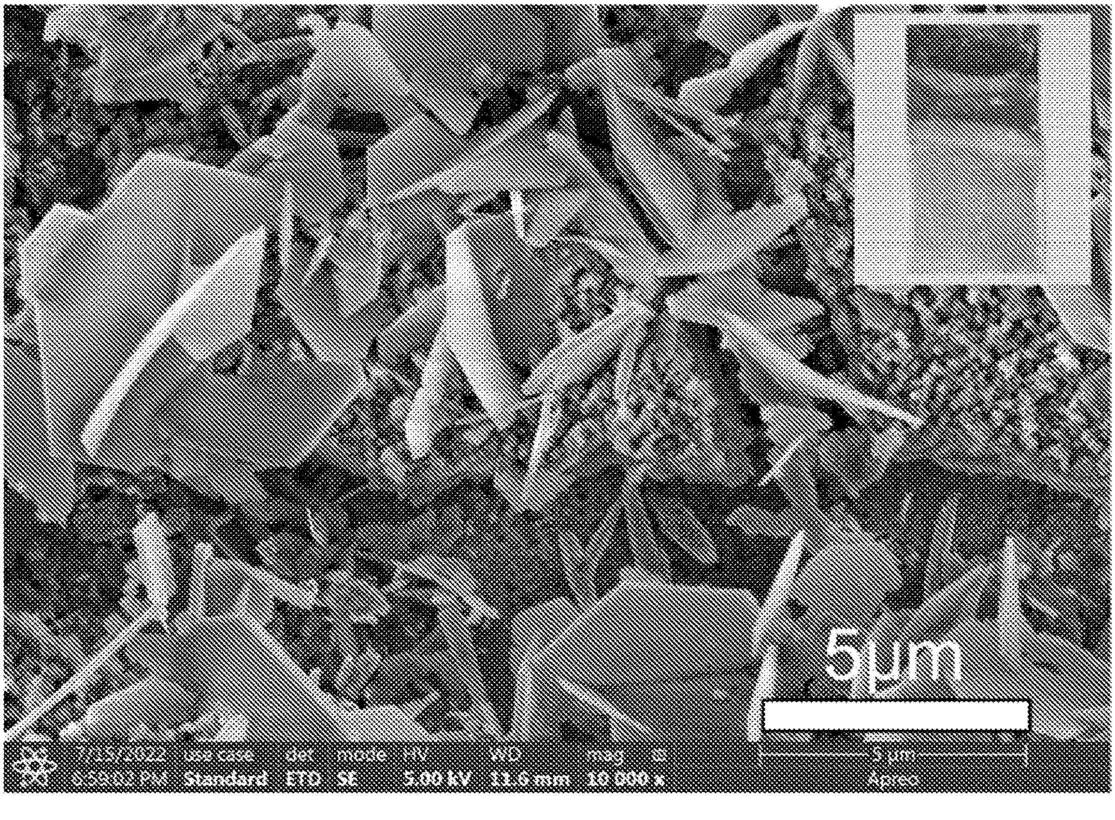
FIG. 11 shows a SEM image of the product in Example 5 of the present disclosure.
Figure 12:
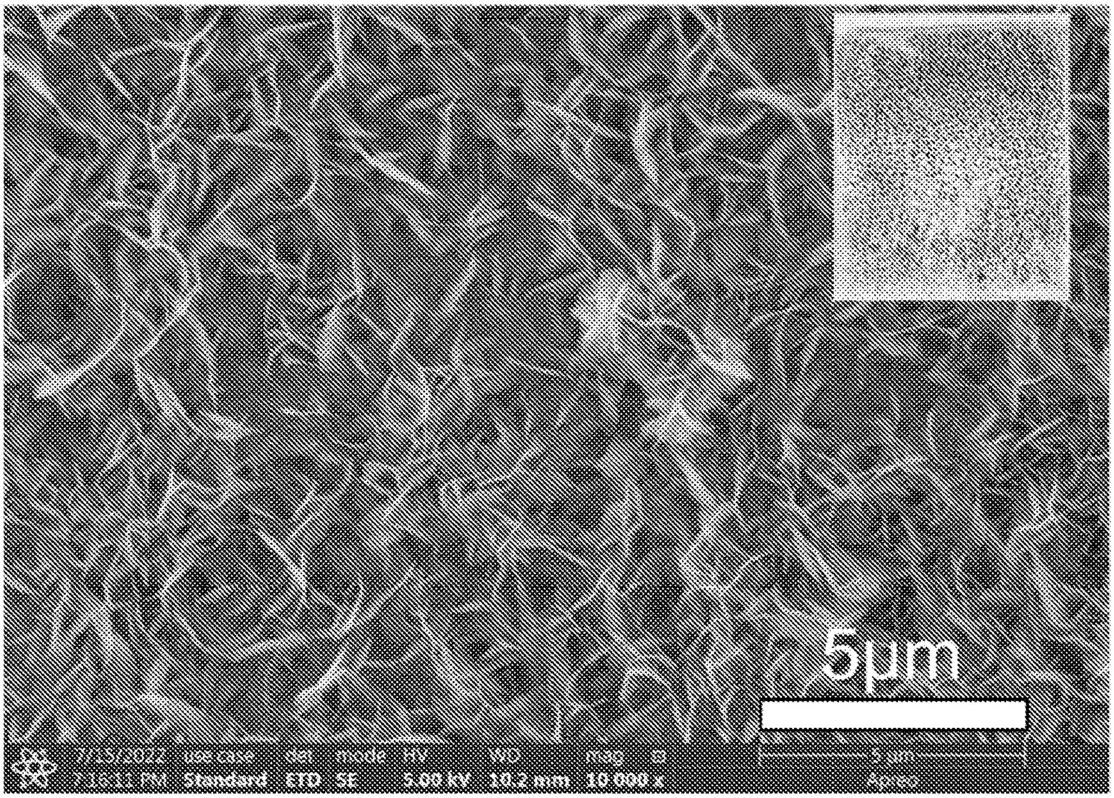
FIG. 12 shows a SEM image of the product in Example 6 of the present disclosure.
Figure 13:
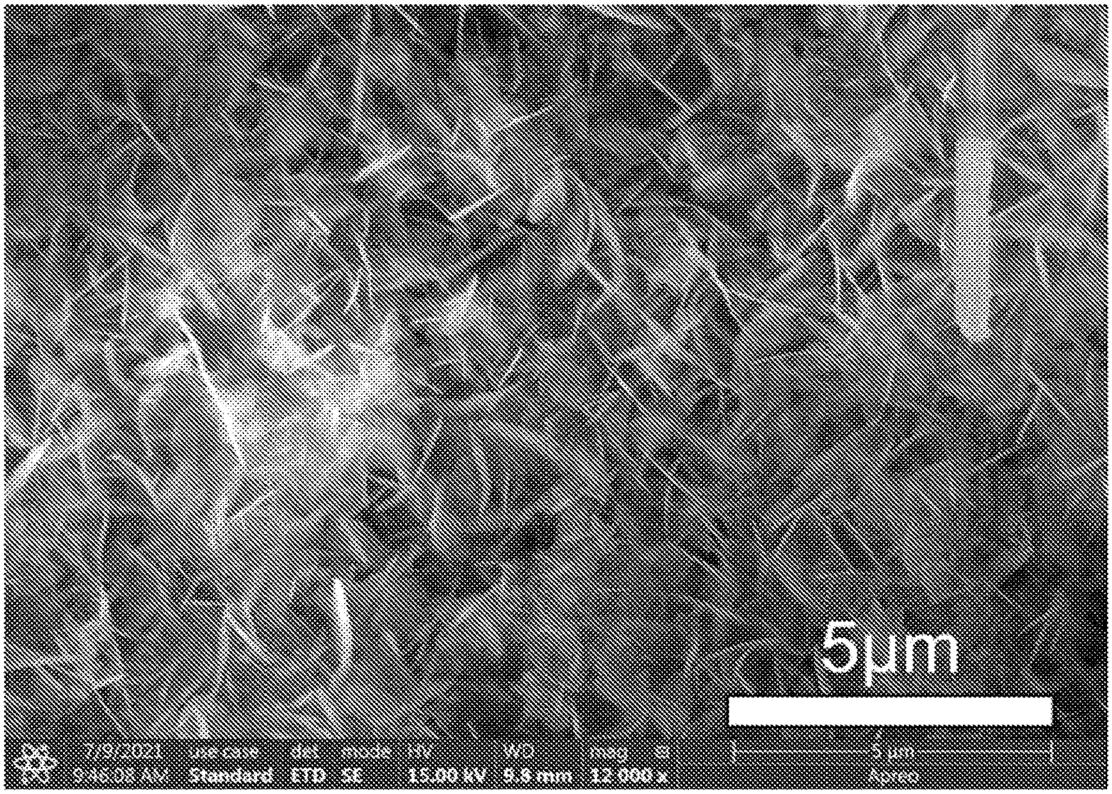
FIG. 13 shows a SEM image of the product in Example 7 of the present disclosure.
Figure 14:
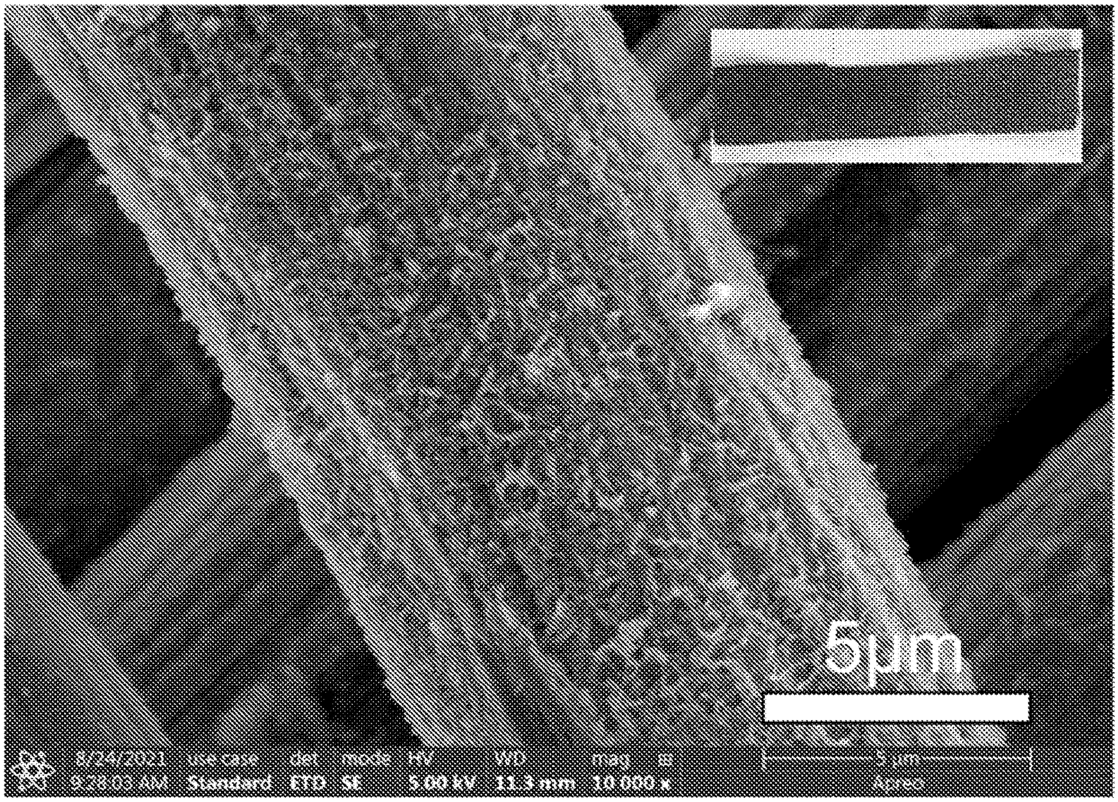
FIG. 14 shows a SEM image of the product in Example 8 of the present disclosure.
Figure 15:
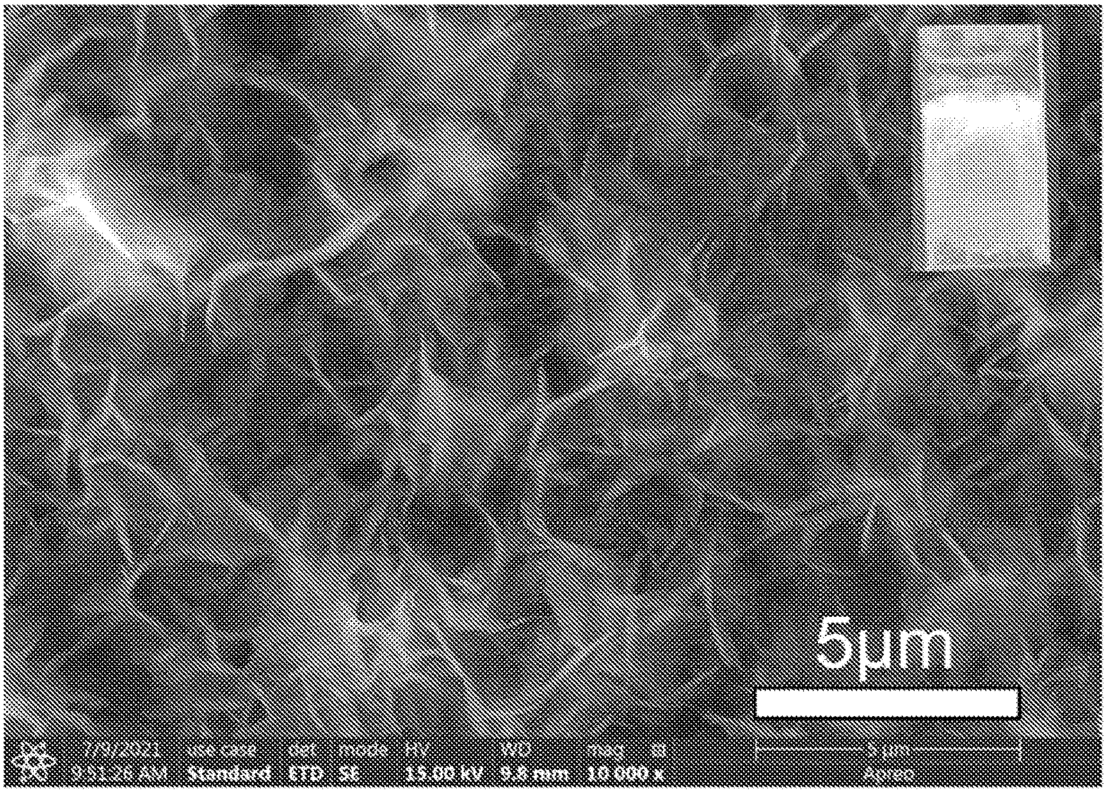
FIG. 15 shows a SEM image of the product in Example 9 of the present disclosure.

The products of Examples 1 to 3 and blank steel sheets were put into a sodium chloride solution with a mass fraction of 3.5% to test their corrosion resistance. The Nyquist diagram was shown in FIG. 7, the Bode plot was shown in FIG. 8, and the polarization curve was shown in FIG. 9. It was seen from FIG. 7 to FIG. 8 that the arc radius and impedance value of the product grown with LDH film were significantly improved, and the product at the voltage of −1.3 V had the most obvious improvement. As shown in FIG. 9, the blank sample had the lowest corrosion potential of −708.57 mV; the product with a voltage of −1.3 V had a corrosion potential of up to −548.59 mV; and the products with voltages of −1.2 V and −1.4 V had corrosion potentials of −663.41 mV and −626.94 mV, respectively. Electrochemical results proved that the LDH film of the present disclosure had desirable corrosion resistance, and the LDH film prepared at an electrodeposition potential of −1.3 V had the best corrosion resistance.

The products of Examples 4 to 9 were observed by SEM, and obtained SEM images were shown in FIG. 10 to FIG. 15, respectively. The picture in the upper right corner among FIG. 10 to FIG. 15 was a physical photograph of each product in Examples 4 to 9. It was seen from FIG. 10 to FIG. 15 that obvious hexagonal LDH nanosheet morphology was seen on different substrates, that is, the LDH protective layers could be grown on different substrates.

Figure 16:
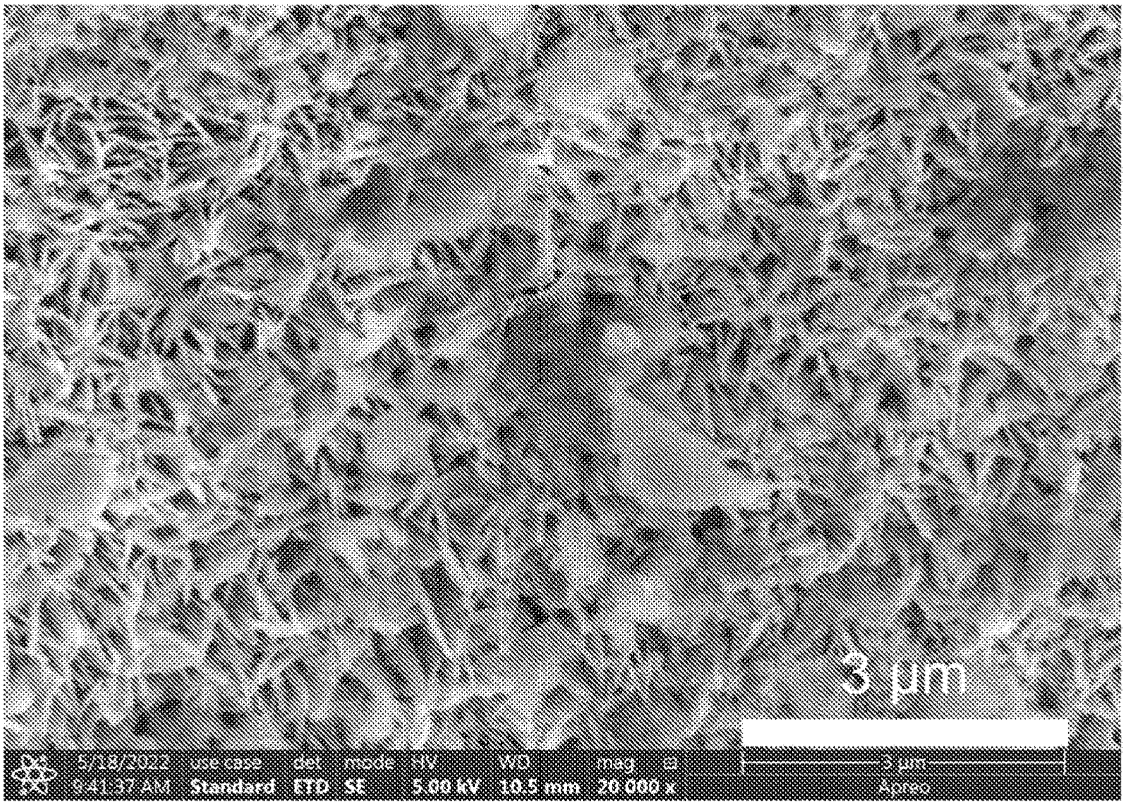
FIG. 16 shows a SEM image of the product in Example 10 of the present disclosure.
Figure 17:
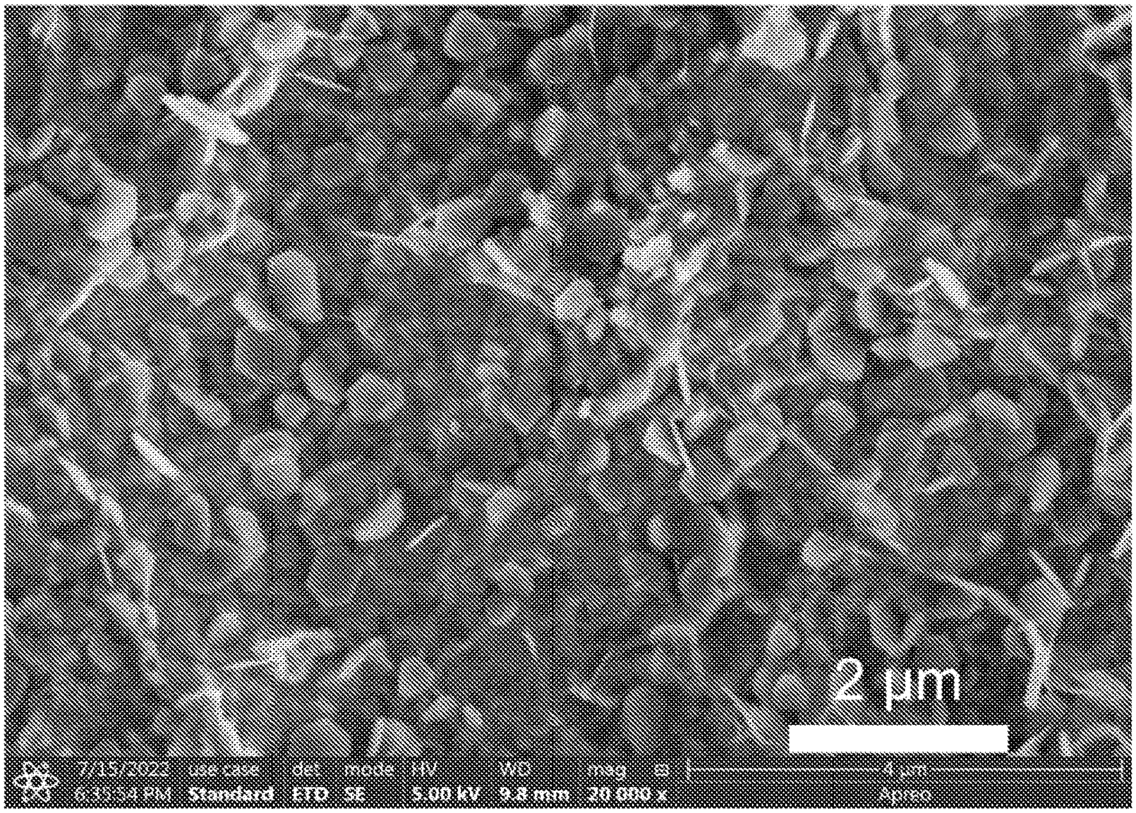
FIG. 17 shows a SEM image of the product in Example 11 of the present disclosure.
Figure 18:
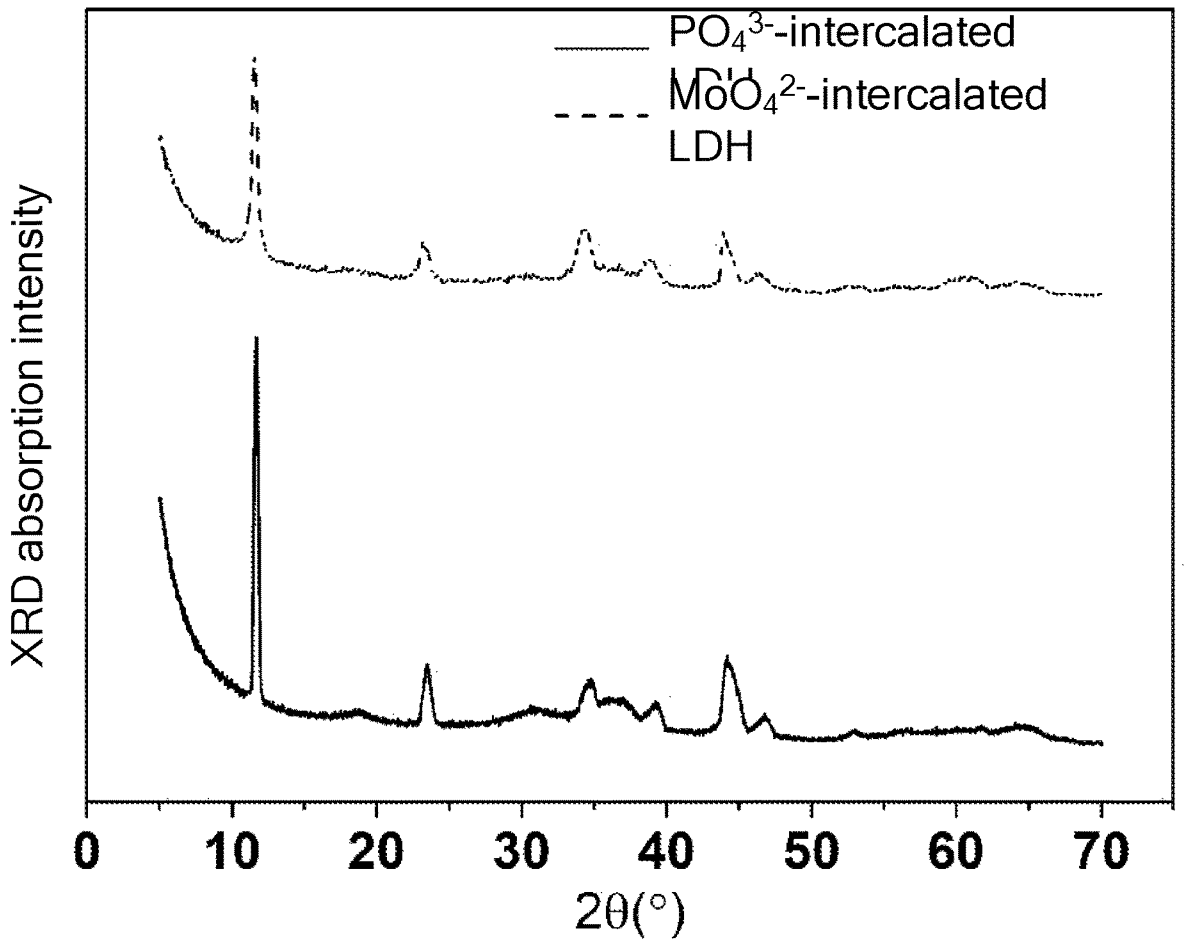
FIG. 18 shows XRD patterns of the products in Examples 10 to 11 of the present invention.
Figure 19:
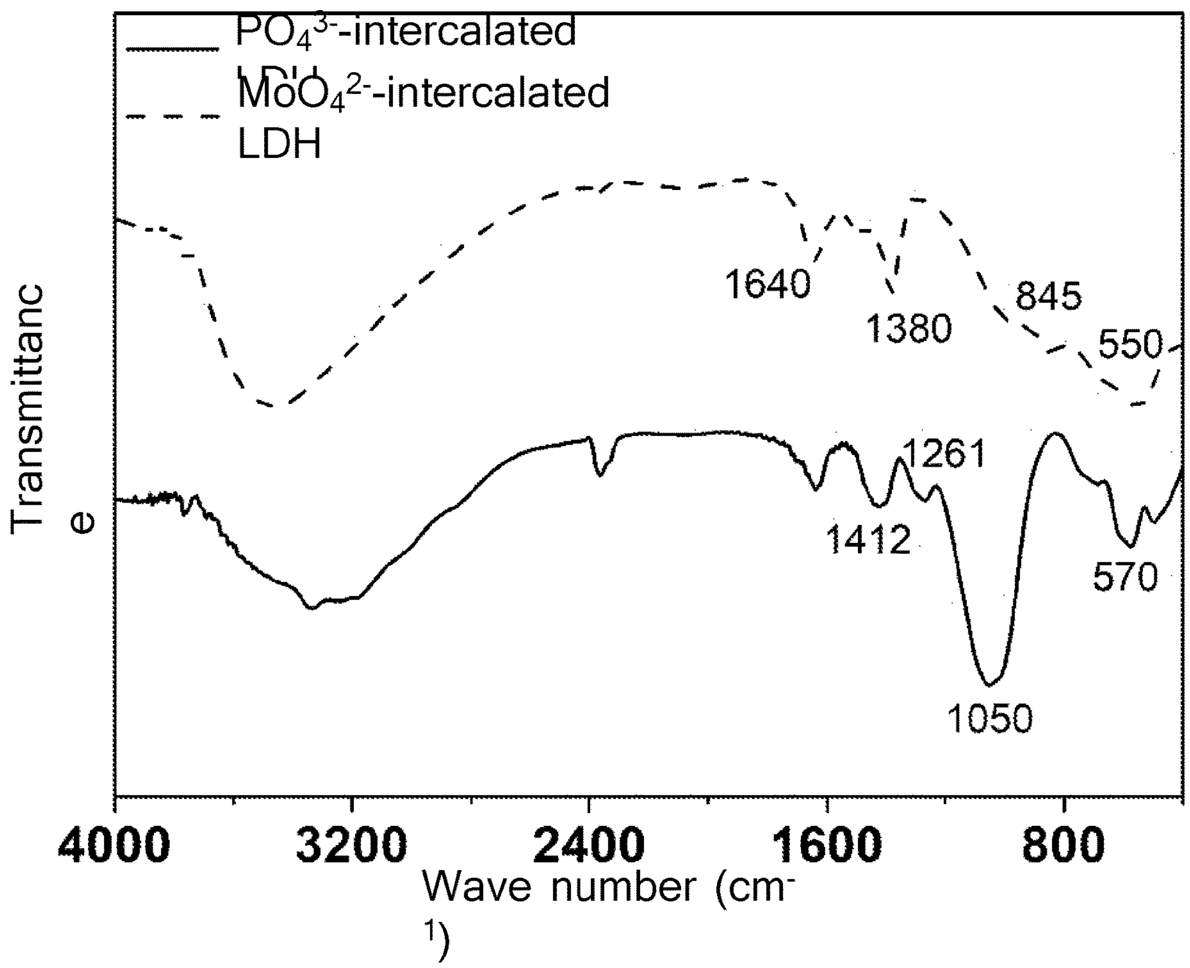
FIG. 19 shows infrared spectrograms of the products in Examples 10 to 11 of the present disclosure.

The products of Examples 10 to 11 were observed by SEM, and obtained SEM images were shown in FIG. 16 to FIG. 17, respectively. An XRD test was conducted on the products of Examples 10 to 11, and obtained XRD patterns were shown in FIG. 18. An infrared spectrogram test was conducted on the products of Examples 10 to 11, and obtained infrared spectrograms were shown in FIG. 19. It was seen from FIG. 16 to FIG. 19 that in the present disclosure, an LDH protective layer with intercalation anions that could be regulated was successfully grown on the surface of the substrate.

The above descriptions are merely preferred implementations of the present disclosure. It should be noted that a person of ordinary skill in the art may further make several improvements and modifications without departing from the principle of the present disclosure, but such improvements and modifications should be deemed as falling within the protection scope of the present disclosure.

What is claimed is:

1. A universal preparation method for in-situ growth of a layered double hydroxide (LDH) layer on a substrate surface, comprising the following steps:

(1) mixing a divalent metal nitrate, a trivalent metal nitrate, and water to obtain a mixed solution;

(2) constructing a three-electrode system using the mixed solution obtained in step (1) as an electrodeposition solution and a substrate as a working electrode, and conducting electrodeposition to obtain a deposited substrate;

(3) mixing the divalent metal nitrate, the trivalent metal nitrate, water, and ammonia water to obtain a hydrothermal reaction solution; and (4) mixing the deposited substrate obtained in step (2) with the hydrothermal reaction solution obtained in step (3), and then conducting a hydrothermal reaction to obtain an LDH protective layer-containing substrate; wherein there is no time sequence between steps (3) and (1), in step (1), the divalent metal nitrate in the mixed solution has a concentration of 40 mmol/L to 50 mmol/L; and in step (2), the electrodeposition is conducted at a voltage of −1.2 V to −1.4 V for 200 sec to 800 sec.

2. The method according to claim 1, wherein in steps (1) and (3), the divalent metal nitrate is one selected from the group consisting of zinc nitrate, magnesium nitrate, cobalt nitrate, nickel nitrate, copper nitrate, and calcium nitrate.

3. The method according to claim 1, wherein in steps (1) and (3), the trivalent metal nitrate is selected from the group consisting of aluminum nitrate and iron nitrate.

4. The method according to claim 1, wherein in steps (1) and (3), the divalent metal nitrate and the trivalent metal nitrate are at a molar ratio of (2-4):1.

5. The method according to claim 1, wherein in step (3), the hydrothermal reaction solution has a pH value of 8 to 14.

6. The method according to claim 1, wherein in step (3), a salt selected from the group consisting of a molybdate, a vanadate, and a dihydrogen phosphate is further added.

7. The method according to claim 1, wherein in step (4), the hydrothermal reaction is conducted at 90° C. to 140° C. for 12 h to 24 h.

* * * * *